Dec. 8, 1970  K. NOACK  3,545,872
HIGH PRESSURE OPTICAL CELL FOR FLUIDS
Filed March 18, 1968  3 Sheets-Sheet 1

INVENTOR.
KLAUS NOACK

Dec. 8, 1970  K. NOACK  3,545,872

HIGH PRESSURE OPTICAL CELL FOR FLUIDS

Filed March 18, 1968  3 Sheets-Sheet 2

INVENTOR.
KLAUS NOACK

United States Patent Office 3,545,872
Patented Dec. 8, 1970

3,545,872
HIGH PRESSURE OPTICAL CELL FOR FLUIDS
Klaus Noack, Geneva, Switzerland, assignor to American Cyanamid Company, Stamford, Conn., a corporation of Maine
Filed Mar. 18, 1968, Ser. No. 713,908
Int. Cl. G01n 21/26, 23/12
U.S. Cl. 356—246
2 Claims

ABSTRACT OF THE DISCLOSURE

An optical cell and combination with a miniature autoclave is described for monitoring reactions under high pressures, particularly between gases and liquids, by means of absorption of spectra in the infrared, visible or ultraviolet region. Liquid from the autoclave in which the reaction is proceeding is pumped by a solenoid driven pump which also effects mixing. The solenoid drive permits circulation without presenting problems of seals in moving pumps.

BACKGROUND OF THE INVENTION

Monitoring the progress of reactions involving liquids and/or gases can be effected by infrared spectrophotometric analysis. However, when reactions are carried out at high pressures, and particularly when the reactions are on a small scale, serious leakage and other problems arise.

SUMMARY OF THE INVENTION

The present invention includes a miniature autoclave and a high pressure optical cell for spectrophotometric observation which is completely leak-proof and permits operation at high pressures, for example a number of atmospheres, particularly reactions with liquids or suspensions of solids in liquids and gases, such as for example the preparation of metal carbonyl compounds and their complexes. The connections between autoclave and cell are through high pressure tubing, without involving any moving parts external to the autoclave. This is the broadest aspect of the invention. In a more specific aspect there is also included an internal circulating pump in the autoclave which is electromagnetically driven by a solenoid and presents no external moving parts.

Dealing with the broader aspect of the invention, namely a cell and autoclave with leak-proof connections, it should be noted that very serious problems are presented when operating at high pressures. Optical cells for the infrared region require infrared transmitting materials, for example such materials as potassium bromide, and the like, which are fragile and can easily be broken if they are bent at all. Nevertheless, leakproofness at the high pressures, which may be in excess of 100 atmospheres, would ordinarily require extremely high pressure clamping of infrared transmitting windows in a cell, but it is just this requirement which makes the problem serious due to the lack of toughness of the material. Accordingly, the invention utilizes a type of seal which expands in a sealing direction when subjected to high pressure liquid on one side. Such seals are constituted by elastomers in grooves, such as for example O-rings of elastomers dimensioned with respect to grooves so that under pressure from high pressure liquids they expand in a direction increasing their sealing pressure. This makes it possible to obtain sealing against high liquid pressures without applying excessive pressures to the rather weak or fragile material used as infrared windows for the cell.

The sealing of the cell also has an additional advantage when windows are to be changed or the cell is to be used with a different reaction mixture and the like. Because the windows do not have to fit with excessive pressures, it is a comparatively simple matter to change windows without exposing the material to the risk of cracking or breaking, which would be necessary if high pressure seals directly involving the material itself were used.

It should be understood that the invention can use sealing materials which are known and which are reasonably available. This is a practical advantage as it restricts to a maximum possible degree the necessity for highly specialized equipment. The invention, of course, is a combination invention in which the various elements co-act with each other to produce the improved result and does not lie in the absolute novelty of a particular element or part taken by itself and not as a part of the combination.

In a more specific aspect a magnetically driven internal pump, which avoids any sealing problems with movable elements, increases reliability and permits very simple design. It should be noted that the magnetically driven pump does not have to work against any significant back pressure. It only serves to circulate continuously or intermittently a portion of the liquid reaction medium through the infrared cell. Thus the pump may have a comparatively loose fitting piston which does not bind or stick and which only has to create a very small pressure differential, which is minute compared to the high pressure under which the reaction and the optical observations are carried out. This simplifies magnetic drive and is an important practical operating advantage, because in some of the reactions there may be involved or produced finely divided solids and these create a serious problem when pumping means are employed which have excessively close fits.

The particular materials of which the apparatus of the present invention is constructed are not critical. For example, autoclaves of stainless steel are very suitable, and the metal elements of the cell may also be of the same material. The windows, of course, must be of materials which have suitable transmission in the wavelength band chosen for the spectral observation. Often these are made of salts, such as bromides or chlorides, or similar chemical compounds, such as for example many of the so-called infrared transmitting glasses which are generally sold under the trade name "Irtran." Other windows may also be used, for example quartz in the near infrared, visible or ultraviolet where its transmission of the radiation is adequate. For the visible part of the spectrum glass can of course also be used. The windows may be comparatively broad in their wavelength transmission or they may be selective. For example, windows of silicon or germanium may be used, although their transmission in windows of greater thickness is sometimes not as high as would be desired. Such windows are selective, germanium for example being opaque to radiations shorter than about 1.8µ; in other words, such windows act as shortwave cut-off filters. For some purposes sharper cutting filters, such as certain interference filters, may be used. For example, when it is desired to monitor the progress of a reaction, it is not necessary to scan and produce a series of infrared spectra. It is possible to use windows which constitute fairly sharp cutting bandpass filters about wavelengths where absorption maxima of a particular product of the reaction occur. In such cases the response may be a continuous electrical measurement of the signal from a suitable infrared detector, after amplification if necessary, which it usually is. Continuous following of a reaction is thus made possible without bulky equipment, such as infrared or ultraviolet spectrophotometers. Because of the relatively low demands on window material as far as mechanical strength is concerned, the present invention often makes such operations feasible which would not be practical otherwise. In general it should be understood that the present invention is not in the slightest concerned with the particular spectroscopic, especially infrared equipment which is used to make the measurements through the cell. The above is merely a description of certain advantages of the invention which lends the cell and autoclave combination to the use of simplified and improved spectroscopic equipment.

DESCRIPTION OF THE PREFERRED EMBODIMENTS

Figure 1:
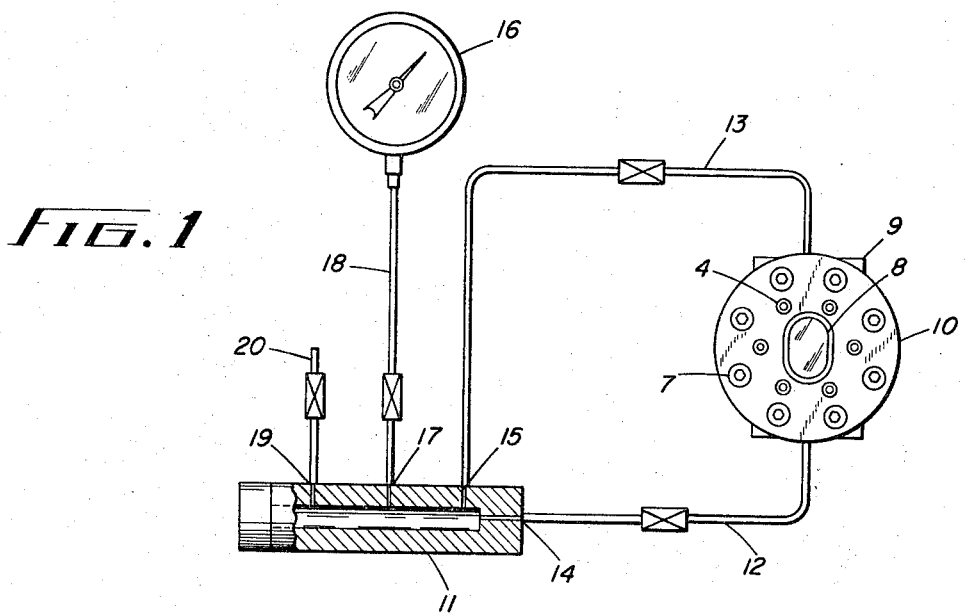
FIG. 1 is a diagrammatic representation of a cell and autoclave combination.

FIG. 1 illustrates, in purely diagrammatic form, a combination of an autoclave and cell. The cell is shown at 10 with an opening 8, and the autoclave, partly broken away in section, at 11. Valve lines 12 and 13 connect one end of the autoclave with channel 14 and a channel 15 on one side of the autoclave forming a complete circuit. The autoclave is provided with a conventional pressure gauge 16 connecting to another channel 17 in the side of the autoclave through a valved conduit 18. Another valved conduit 20 connects to a channel 19 near the other end of the autoclave and is normally closed, being used primarily for filling the autoclave initially.

The autoclave is normally provided with an electrical heater (not shown), and if needed a cooling coil on its outside, which is also not shown as these are conventional pieces of equipment for an autoclave and would only confuse the drawing. When the autoclave is charged through conduit 19, for example with a gas and a liquid or liquid suspension of finely divided solids, the valve 20 is shut off, the autoclave brought up to temperature, and the reaction starts. By tilting the system and opening one or both of the valves in the conduits 12 and 13, a portion of the liquid is led into the cell 10 where it can be examined by infrared or other optical means. After the lapse of a certain time the equipment is tilted again and another sample introduced. During spectral observation the valves in the conduits 12 and 13 may be closed. The operation of the pressure gauge 16 and its valved conduit 18 is self-explanatory and serves to monitor the pressure existing in the autoclave.

Figure 4:
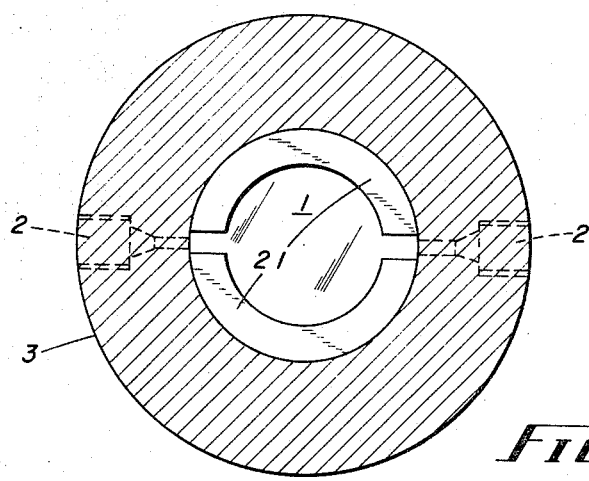
FIG. 4 is a cross-section along the line 4—4 of FIG. 2.
Figure 2:
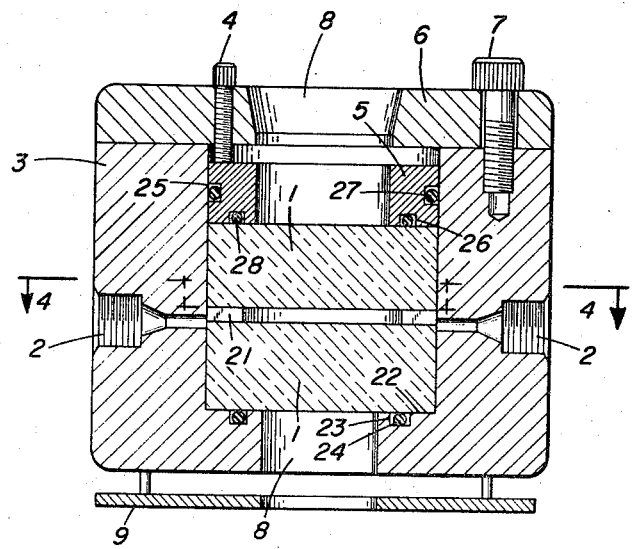
FIG. 2 is a cross-section through the cell of the present invention taken along the line 2—2 of FIG. 3.

FIG. 2 illustrates a cell according to the present invention. Two blocks of infrared visible or ultraviolet transmitting material are shown at 1. They are separated by spacers, for example of polytetrafluoroethylene, shown in FIG. 4 as spacers at 21. As a result, there is a narrow channel, for example from 0.1 to 1 mm. between the plates 1. This communicates with conduits in a block 3 of stainless steel constituting the major structural element of the cell, pressure conduits 12 and 13 fastening into the pressure conduit adapters 2. Such high pressure tubing and adapters are conventional equipment, and the tubes are not shown in FIG. 2 in order not to confuse the drawing unnecessarily.

Figure 3:
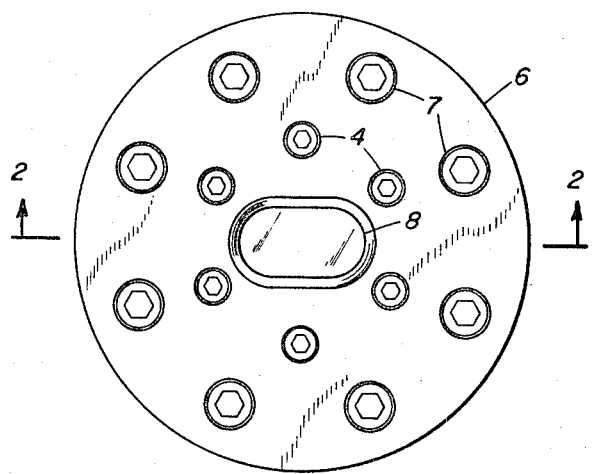
FIG. 3 is a plan view of one end of the cell.

The block 3 is mounted on a suitable plate 9, which can also be seen in FIG. 1. In the center of the block and its mounting plate is an elliptical opening 8. A similar elliptical opening 8 appears in a stainless steel cover 6, which is also shown in FIG. 3. Within the block 3 there is a large channel ending in a shoulder 22. The internal diameter of this opening corresponds to the external diameter of the optical windows 1 but does not require a tight fit of the windows, as will be explained below. The shoulder 22 is provided with a circular groove 23 in which there is an O-ring 24 of elastomeric material.

At the other end of the block an inner holding plate 5 is present with one groove 25 on its side and another groove 26 at its bottom. The grooves carry respectively O-rings 27 and 28 of elastomeric material. When the cell is to be assembled, the optical window blocks 1 and their spacers 21 are inserted, as can be seen in FIGS. 2 and 3. Then the inner pressure ring or plate 5 is applied, the upper cover 6 mounted, and bolted down with a series of bolts 7 which maintain cover 6 in a stationary position. Finally, a series of adjustable bolts 4 which extend through cover 6 are cautiously screwed in to press down the plate 5 onto the blocks 1 by the use of a compressive force only. Because of the fragile and brittle nature of the blocks this operation should be effected carefully, the series of bolts 4 being tightened successively and gradually to prevent any unbalanced strain on the blocks. It is only necessary to clamp the blocks snugly, sufficiently so that the O-rings 24, 27 and 28 are compressed so that they expand in their grooves and plate 5 just touches the window blocks. The cover 6 is provided with an elliptical opening 8 of the same shape as that provided in the bottom of the block 3.

When a layer of liquid has been introduced into the cell, as has been described in conjunction with FIG. 1, the valves in the conduits 12 and 13 are closed and the liquid is examined by spectroscopy, as for instance infrared, using suitable infrared measuring equipment, which is not shown as it is not changed by the present invention. After determining the spectral characteristics of the liquid layer, another liquid layer can be introduced at a somewhat later time and measured. It will be apparent that the above description describes a measurement of the layers sequentially and might be considered as a batch operation as far as the spectral examination is concerned. After the spectral examination shows that the reaction has proceeded to the desired point, the autoclave can be cooled down, pressure released, and the reaction mixture removed.

In general, no particular problem is presented by bubbles of gas if the spacing between the blocks 1 is 0.1 mm. or greater. Narrower spacings, which would produce very thin layers of liquid, can present some problem of bubbles, and in such a case care should be taken that bubbles are not introduced as they can have a spurious effect on the spectral examination.

Figure 5:
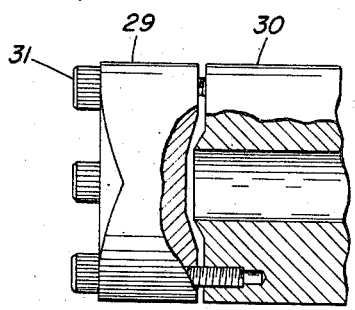
FIG. 5 is an elevation, partly broken away in section, of a portion of an autoclave with an ordinary cover.

FIG. 5 shows a portion of the autoclave with the autoclave body at 30 with an autoclave top 29 fastened by bolts 31. This is a conventional form of attaching ends to an autoclave, and so is shown in somewhat diagrammatic form.

Figure 6:
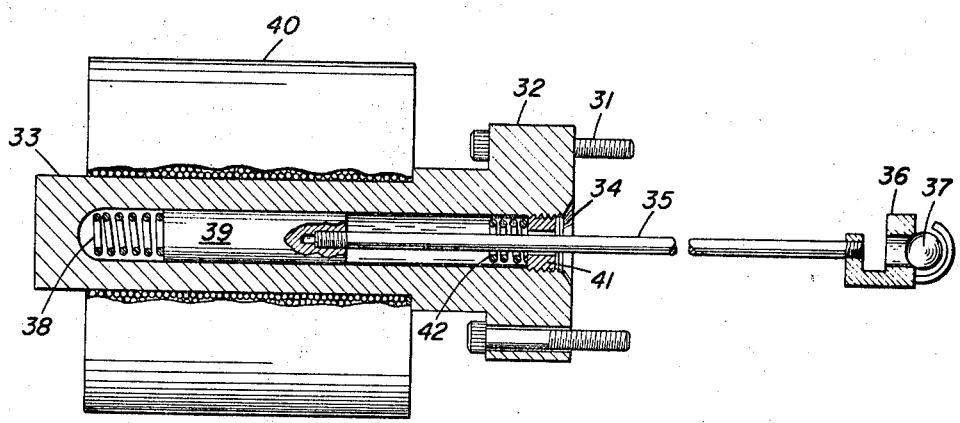
FIG. 6 is a cross-section through a modified autoclave cover showing a magnetically driven circulating pump.

FIG. 6 is an enlarged section through a pumping and circulating device. A modified form of autoclave cover is shown at 32, the bolts bearing the same number as in FIG. 5. This cover has a long upward extension 33 which is hollow but has a closed end. The autoclave cover itself has an opening 34 through which the rod 35 of a circulating pump piston 36 with non-return valve 37 passes. At the other end of the extension 33 is a spring 38 which bears on the soft iron core 39 of a solenoid 40. As the solenoid coil is of conventional design, the power wires are not shown. At the bottom of the extension 33 there is a guide 41 with a spring 42 which prevents the core 39 of the solenoid from striking the guide 41.

Figure 7:
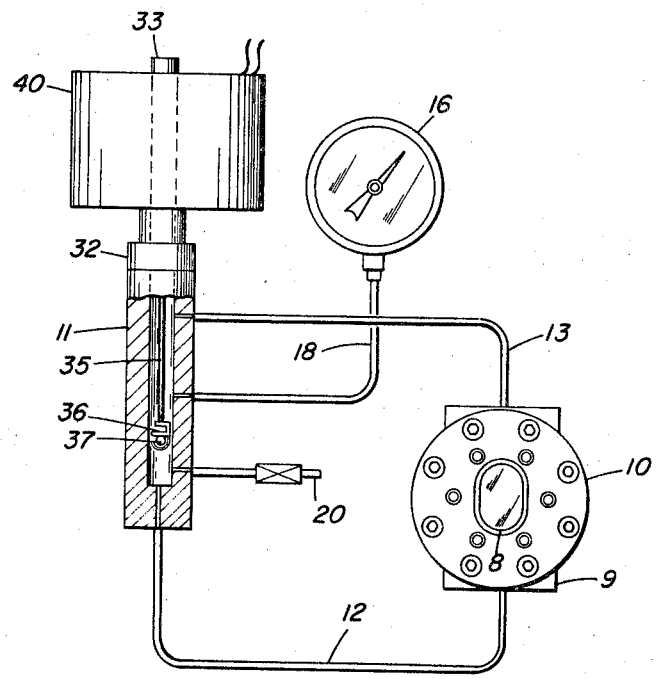
FIG. 7 is a diagrammatic representation of an autoclave and cell with positive circulation of reaction liquid.

FIG. 7 shows in diagrammatic form a circuit similar to FIG. 1 but with the circulating pump illustrated in FIG. 6. In operation, after the autoclave has been filled, as has been described above, the solenoid is subjected to repetitive pulses of current, causing the pump piston 36 to move up and down in the autoclave. When the solenoid is energized, the core is moved up, compresses the spring 38, and this furnishes the power to move the piston rod 35 and with it the pump 36 on the return stroke. For most operatitons a pumping rate of 1 or 2 strokes a second is quite adequate. The arrangement shown in FIG. 7 provides a regular flow of liquid through the cell and does not require tilting the autoclave. This is an advantage as a fixed mounting can be used, and also the pumping action serves to stir and mix the reaction medium during reaction, which is often desirable.

What is claimed is:

1. A high pressure optical cell comprising in combination:
    (a) a pressure resistant body having a central opening and a shoulder at one end;
    (b) a pair of light transparent blocks fitting loosely in said central opening and spaced apart with spacers;
    (c) conduits in said pressure resistant body communicating with the space between said transparent blocks and provided with connecting means for pressure tubing;
    (d) a first plate having a central opening, said opening communicating with the central opening of said pressure resistant body;
    (e) means for bolting said first plate to said pressure resistant body so that said plate is maintained in a stationary position;
    (f) a second plate contacting one of said transparent blocks, said second plate having a central opening which communicates with said block;
    (g) means for clamping said second plate uniformly against the surface of one of said blocks by the application of a compressive force only against said block surface, said clamping means comprising adjustable members extending through said first plate;
    (h) sealing means consisting of a continuous groove in the shoulder of said pressure body, a peripheral groove in said second plate and a groove in the surface of said second plate which contacts said transparent block, the grooves bieng filled with compressible elastomeric material capable of expanding, whereby sealing against fluid outflow from the space between said transparent blocks is effected by expansion of said elastomeric material.

2. The cell of claim 1 wherein said means for clamping said second plate uniformly against the surface of one of said blocks comprises a series of bolts threaded through said first plate.

References Cited

UNITED STATES PATENTS

| 2,819,402 | 1/1958 | Watson et al. | 250—43.5 |
| 2,940,360 | 6/1960 | Carter, Jr. | 356—244X |
| 2,974,226 | 3/1961 | Fisher | 250—43.5 |

WILLIAM F. LINDQUIST, Primary Examiner

U.S. Cl. X.R.

250—43.5